(12) United States Patent
Jones et al.

(10) Patent No.: US 8,232,438 B2
(45) Date of Patent: Jul. 31, 2012

(54) METHOD AND SYSTEM FOR JOINTLY PRODUCING AND PROCESSING HYDROCARBONS FROM NATURAL GAS HYDRATE AND CONVENTIONAL HYDROCARBON RESERVOIRS

(75) Inventors: Emrys Heigh Jones, Fallbrook, CA (US); John Thomas Balczewski, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 881 days.

(21) Appl. No.: 12/197,811

(22) Filed: Aug. 25, 2008

(65) Prior Publication Data

US 2010/0048963 A1    Feb. 25, 2010

(51) Int. Cl.
*E21B 43/17* (2006.01)
*E21B 43/01* (2006.01)
(52) U.S. Cl. ......... 585/15; 166/52; 166/244.1; 166/267
(58) Field of Classification Search ............. 585/15
See application file for complete search history.

(56) References Cited

U.S. PATENT DOCUMENTS

| | | | |
|---|---|---|---|
| 392,007 A | 11/1975 | Kern | |
| 400,778 A | 2/1977 | Cottle | |
| 437,646 A | 3/1983 | Elliott et al. | |
| 442,486 A | 1/1984 | McGuire | |
| 526,149 A | 11/1993 | Ebinuma | |
| 5,711,374 A | 1/1998 | Kjos | |
| 595,073 A | 9/1999 | Agee et al. | |
| 5,964,550 A * | 10/1999 | Blandford et al. | 405/224 |
| 614,891 A | 11/2000 | Gipson et al. | |
| 6,209,965 B1 | 4/2001 | Borns et al. | |
| 6,299,256 B1 | 10/2001 | Wyatt | |
| 6,733,573 B2 | 5/2004 | Lyon | |
| 6,817,427 B2 | 11/2004 | Matsuo et al. | |
| 6,973,968 B2 | 12/2005 | Pfefferle | |
| 6,978,837 B2 | 12/2005 | Yemington | |
| 6,994,159 B2 | 2/2006 | Wendland | |
| 7,093,655 B2 | 8/2006 | Atkinson | |
| 7,165,621 B2 | 1/2007 | Ayoub et al. | |
| 7,222,673 B2 | 5/2007 | Graue et al. | |
| 7,299,868 B2 | 11/2007 | Zapadinski | |
| 7,322,409 B2 | 1/2008 | Wittle et al. | |
| 7,343,971 B2 | 3/2008 | Pfefferle | |
| 7,721,807 B2 * | 5/2010 | Stoisits et al. | 166/366 |

(Continued)

OTHER PUBLICATIONS

PCT Search Report, PCT/US2009/054730, intl. fiing date Aug. 28, 2009, 7 pages.

*Primary Examiner* — Ellen McAvoy
(74) *Attorney, Agent, or Firm* — Marie L. Clapp

(57) ABSTRACT

A method, system, and method for developing the system, for producing hydrocarbons from a plurality of hydrocarbon containing reservoirs is described. The system includes at least one conventional hydrocarbon reservoir and at least one natural gas hydrate reservoir. The system also includes a production facility, including water separation apparatus, which is in fluid communication with the at least one hydrocarbon reservoir and the at least one natural gas hydrate reservoir. The production facility can separate hydrocarbons and water concurrently received from the first conventional hydrocarbon and the second natural gas hydrate reservoirs. The at least one hydrocarbon reservoir and the at least one hydrate reservoir can be concurrently developed. Or else, the at least one hydrate reservoir can be developed later in time and then fluidly connected to the production facility.

19 Claims, 6 Drawing Sheets

U.S. PATENT DOCUMENTS

| | | |
|---|---|---|
| 7,914,749 B2* | 3/2011 | Carstens et al. .............. 422/198 |
| 2003/0178195 A1* | 9/2003 | Agee et al. .................... 166/248 |
| 2004/0140100 A1 | 7/2004 | Wijngaarden et al. |
| 2004/0198611 A1 | 10/2004 | Atkinson |
| 2005/0034869 A1 | 2/2005 | Appleford et al. |
| 2005/0072301 A1 | 4/2005 | Baciu |
| 2005/0121200 A1 | 6/2005 | Sivaraman |
| 2005/0161217 A1 | 7/2005 | Wittle et al. |
| 2007/0144738 A1 | 6/2007 | Sugiyama et al. |
| 2007/0144741 A1 | 6/2007 | Cho et al. |
| 2007/0163780 A1 | 7/2007 | Onodera et al. |
| 2007/0193303 A1* | 8/2007 | Hawrysz et al. ................ 62/612 |
| 2010/0163246 A1* | 7/2010 | Balzcewski ................... 166/369 |

\* cited by examiner

METHOD AND SYSTEM FOR JOINTLY PRODUCING AND PROCESSING HYDROCARBONS FROM NATURAL GAS HYDRATE AND CONVENTIONAL HYDROCARBON RESERVOIRS

TECHNICAL FIELD

The present invention relates generally to methods and systems for producing and processing hydrocarbons from subterranean formations, and more particularly, to the production of natural gas from natural gas hydrate reservoirs.

BACKGROUND

Natural gas is a gaseous fossil fuel consisting primarily of methane but often including significant quantities of ethane, propane, butane, pentane and heavier hydrocarbons. Natural gas produced from subterranean formations may also contain undesirable components such as carbon dioxide, nitrogen, helium and hydrogen sulfide. The undesirable components are usually removed before the natural gas is used as a fuel.

Natural gas hydrates ((NGH) or clathrate hydrates of natural gases, often simply called "hydrates") form when water and certain gas molecules are brought together under suitable conditions of relatively high pressure and low temperature. Under these conditions the 'host' water molecules will form a cage or lattice structure capturing a "guest" gas molecule inside. Large quantities of gas are closely packed together by this mechanism. For example, a cubic meter of methane hydrate contains 0.8 cubic meters of water and up to 172 cubic meters of methane gas. While the most common clathrate on earth is methane hydrate, other gases also form hydrates including hydrocarbon gases such as ethane and propane as well as non-hydrocarbon gases such as $CO_2$ and $H_2S$.

NGH occur naturally and are widely found in sediments associated with deep permafrost in Arctic environments and continental margins at water depths generally greater than 500 meters (1600 feet) at mid to low latitudes and greater than 150-200 meters (500-650 feet) at high latitudes. The thickness of the hydrate stability zone varies with temperature, pressure, composition of the hydrate-forming gas, geologic conditions and other factors. Worldwide, estimates of the natural gas potential of methane hydrates approach 700,000 trillion cubic feet—a staggeringly large figure compared to the 5,500 trillion cubic feet that make up the world's current proven gas reserves.

Most of the natural gas hydrate research to date has focused on basic research as well as detection and characterization of natural gas hydrate deposits which contain primarily methane hydrates. Developing a safe and cost effective method of producing natural gas from natural gas hydrate reservoirs remains a significant technical and economic challenge.

Natural gas hydrate production profile curves are believed to generally follow a characteristic pattern: gas production is initially low and water production is high. After production starts, typically relatively long periods of time (months to many years) pass before the water production declines to a relatively low level and gas production increases to a relatively high level. These relatively high levels of natural gas production rates are then often sustainable for many years.

This inherent production profile has negative economic impacts from a Net Present Value perspective. Expensive production facilities have to be built to handle the processing of fluids from the natural gas hydrate reservoir.

Referring now to the flowchart of FIG. 1, produced fluids from a conventional hydrocarbon reservoir are transported to a production facility, such as located on an offshore platform or on land. The produced fluid may be separated by separation apparatus 11 into predominantly water, oil and gas phases. The gas is treated using conventional gas treatment apparatus 12 to remove contaminants such as $CO_2$ and $H_2S$. The treated gas then may then be compressed and exported such as by using a compressor 13. The compressed gas may be introduced into a pipeline or shipped as compressed natural gas in a tanker. Alternatively, the natural gas may be liquefied and shipped by tanker or else converted by a gas-to-liquids process into a liquid product such as by using a Fischer-Tropsch process. The separated crude oil may be treated by treatment apparatus 14 such as to remove contaminants such as mercury and/or other heavy metals. The treated crude oil may then be stored or exported using apparatus 15. The separated water may be treated using conventional water treatment apparatus, such as is well known by those skilled in the art, so that the water may be disposed of into a body of water if sufficiently treated or else reinjected into a subterranean formation. This list of apparatus employed by a production facility is offered by way of example and certainly is not exhaustive of all the apparatus used in a production facility to process produced fluids from a hydrocarbon bearing reservoir. The term "production facility" refers to any equipment or set of equipment which is used to separate and/or treat produced fluids from a hydrocarbon bearing reservoir such as those pieces of equipment referred to above.

In the case of NGH, these production facilities have to be purchased, installed and operated for potentially years before relatively high gas production rates can be achieved. Unfortunately the time value of money tends to dominate the economic outcome due to the initial cost of production facilities combined with years of operation at a loss while awaiting hydrocarbon production rates to climb above break-even levels. Accordingly, many persons skilled in the arts of hydrocarbon and hydrate extraction currently believe that it is not likely to be economically feasible to develop natural gas hydrate fields. Consequently, there is a need for a method and system for production of natural gas which minimizes this economic challenge in developing and producing natural gas hydrate reservoirs.

As used hereinafter, the term "conventional hydrocarbon reservoir" refers to a reservoir which contains hydrocarbons in a gaseous and/or liquid state as compared to hydrocarbons trapped as clathrate hydrates. Production profile curves for conventional hydrocarbon reservoirs offer a different characteristic pattern from that of production curves associated with natural gas hydrate reservoirs: hydrocarbon production of conventional hydrocarbon reservoirs is initially high and water production is low. Later in the production life of the conventional hydrocarbon reservoir, lesser and lesser quantities of hydrocarbons are produced and more and more water is produced.

While this means there are time value of money benefits to conventional hydrocarbon reservoir production, it is also clear that hydrocarbon production facilities are not fully utilized except for early years at the peak of hydrocarbon production and water production facilities in later years as water production reaches the maximum capacity of the facility. In cases where production from these reservoirs are brought on line generally concurrently, substantial production facilities need to be built to provide sufficient processing capabilities at peak hydrocarbon production. Similarly, substantial water separation and handling facilities must be built to accommodate the large water production which will occur later in the production lives of the reservoirs. It is expensive to add capacity after the initial construction of the production facility so generally all of the needed hydrocarbon and water processing equipment is installed at the beginning of a project. As a result, water processing facilities are underutilized early in the production life of these conventional hydrocarbon reservoirs and hydrocarbon processing facilities are underutilized at later stages of the lives of conventional hydrocarbon reservoirs.

There is a need to minimize the underutilization of production facilities associated with production from conventional hydrocarbon reservoirs as well as a need to minimize the underutilization of production facilities associated with production from natural gas hydrate reservoirs.

SUMMARY

A method for producing hydrocarbons from a plurality of hydrocarbon containing reservoirs is described. A first mixture of water and hydrocarbons, including at least one of oil and natural gas, is produced from at least one conventional hydrocarbon reservoir. This first mixture is transported to a production facility which includes water separation apparatus. A second mixture of water and natural gas is produced from at least one natural gas hydrate reservoir and transported to the production facility. The first and second mixtures are then processed by the production facility to at least partially separate water and hydrocarbons. The first and second mixtures may be separated into oil, natural gas and water utilizing the production facility. Further treating and handling of the oil, natural gas and water may also be performed.

At least one natural gas hydrate reservoir may be disposed beneath a sea floor. Alternatively, at least one natural gas hydrate reservoir might be disposed on land beneath permafrost. The production facility may be located offshore such as on a fixed platform or floating production unit or else may be located onshore such as on permafrost.

Also disclosed is a hydrocarbon production system. The system comprises one or more first conventional hydrocarbon reservoirs containing water and hydrocarbons including at least one of oil and gas. The system also comprises one or more second natural gas hydrate reservoirs containing natural gas hydrates. Furthermore, the system includes a production facility, including water separation apparatus, which is in fluid communication with the first one or more conventional hydrocarbon reservoir(s) and the one or more second natural gas hydrate reservoir(s). The production facility can separate hydrocarbons and water concurrently produced and received from the first conventional hydrocarbon and the second natural gas hydrate reservoirs. The gas hydrate reservoir or reservoirs may be disposed beneath a sea floor or may be located on shore beneath permafrost.

A method of developing a hydrocarbon production system is also described. One or more conventional hydrocarbon reservoirs containing water and hydrocarbons are developed. Also, one or more natural gas hydrate reservoirs containing natural gas hydrates are developed. A production facility, including water separation apparatus, is constructed or developed. The conventional hydrocarbon reservoir or reservoirs and the natural gas hydrate reservoir or reservoirs are fluidly connected to the production facility. The production facility can then process mixtures of fluids concurrently produced from both the conventional and natural gas hydrate reservoirs.

The one or more conventional hydrocarbon reservoirs and the production facility can be first developed. Later, the natural gas hydrate reservoir or reservoirs may be developed as an add-on. Alternatively, the conventional reservoir or reservoirs, the natural gas hydrate reservoir or reservoirs and the production facility may be generally concurrently constructed. In either case, ideally the production facility may be more fully utilized over the production life of the reservoirs by processing the concurrent production from the natural gas hydrate and conventional hydrocarbon reservoirs than production individually from natural gas hydrate reservoirs or individually from conventional hydrocarbon reservoirs.

It is an object of the present invention to provide a method to improve the economics of natural gas production from conventional and natural gas hydrate reservoirs by jointly utilizing a production facility which also treats gas and/or oil concurrently produced from one or more conventional oil and gas reservoirs.

It is another object to provide a system whereby concurrent fluid production of natural gas hydrate fields and conventional oil and gas fields are processed by the same production facility. This has the effect of combining the production profiles from the natural gas hydrate and the conventional gas and/or oil reservoirs thus improving the overall economics of producing hydrocarbons from the fields as compared to using distinct production facilities for the respective conventional hydrocarbon fields or reservoirs and the natural gas hydrate fields or reservoirs.

BRIEF DESCRIPTION OF THE DRAWINGS

These and other objects, features and advantages of the present invention will become better understood with regard to the following description, pending claims and accompanying drawings where:

DETAILED DESCRIPTION

Figure 1:
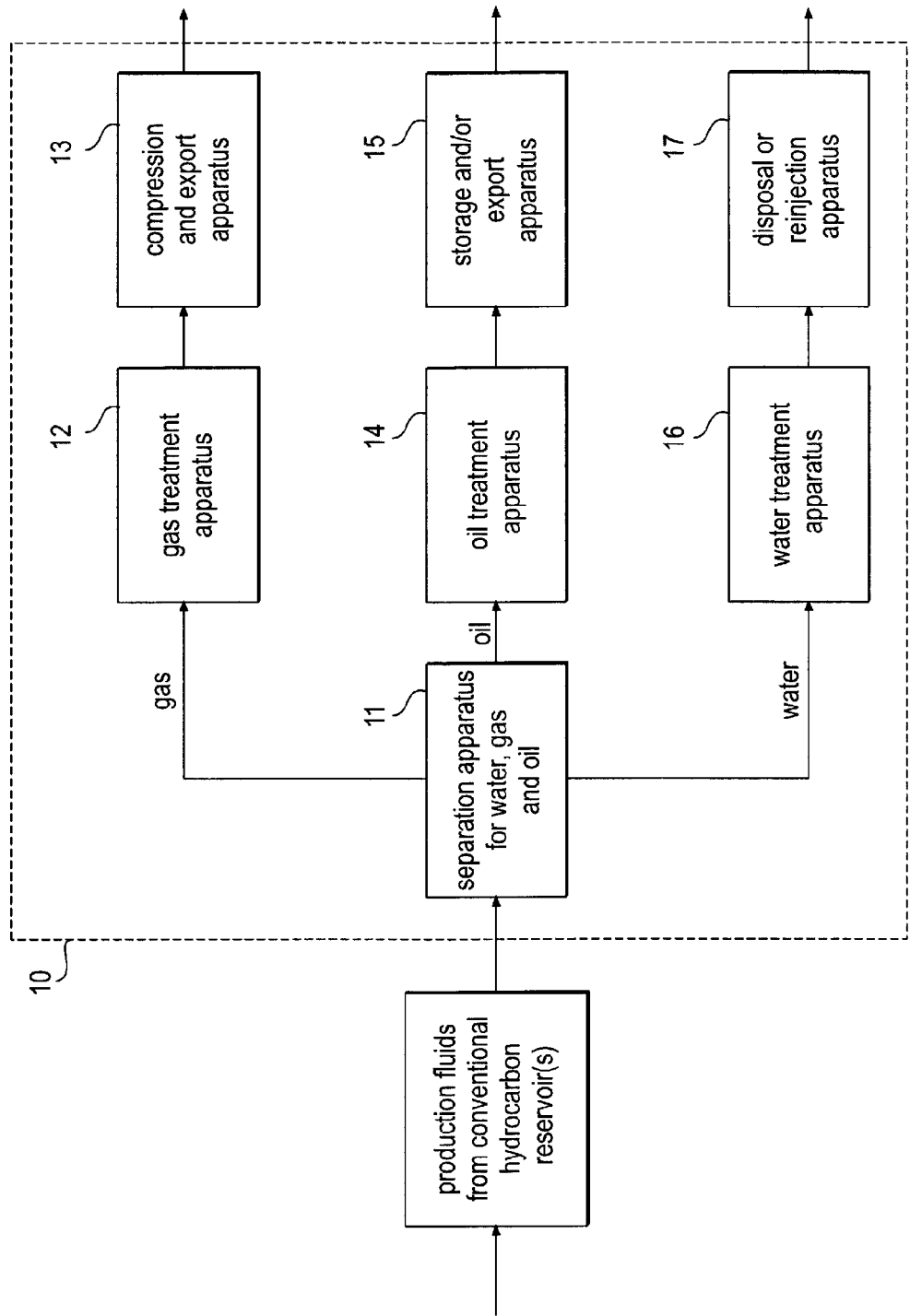
FIG. 1 is a flowchart showing how produced fluids from a conventional hydrocarbon reservoir are separated and then treated by a conventional production facility.
Figure 2:
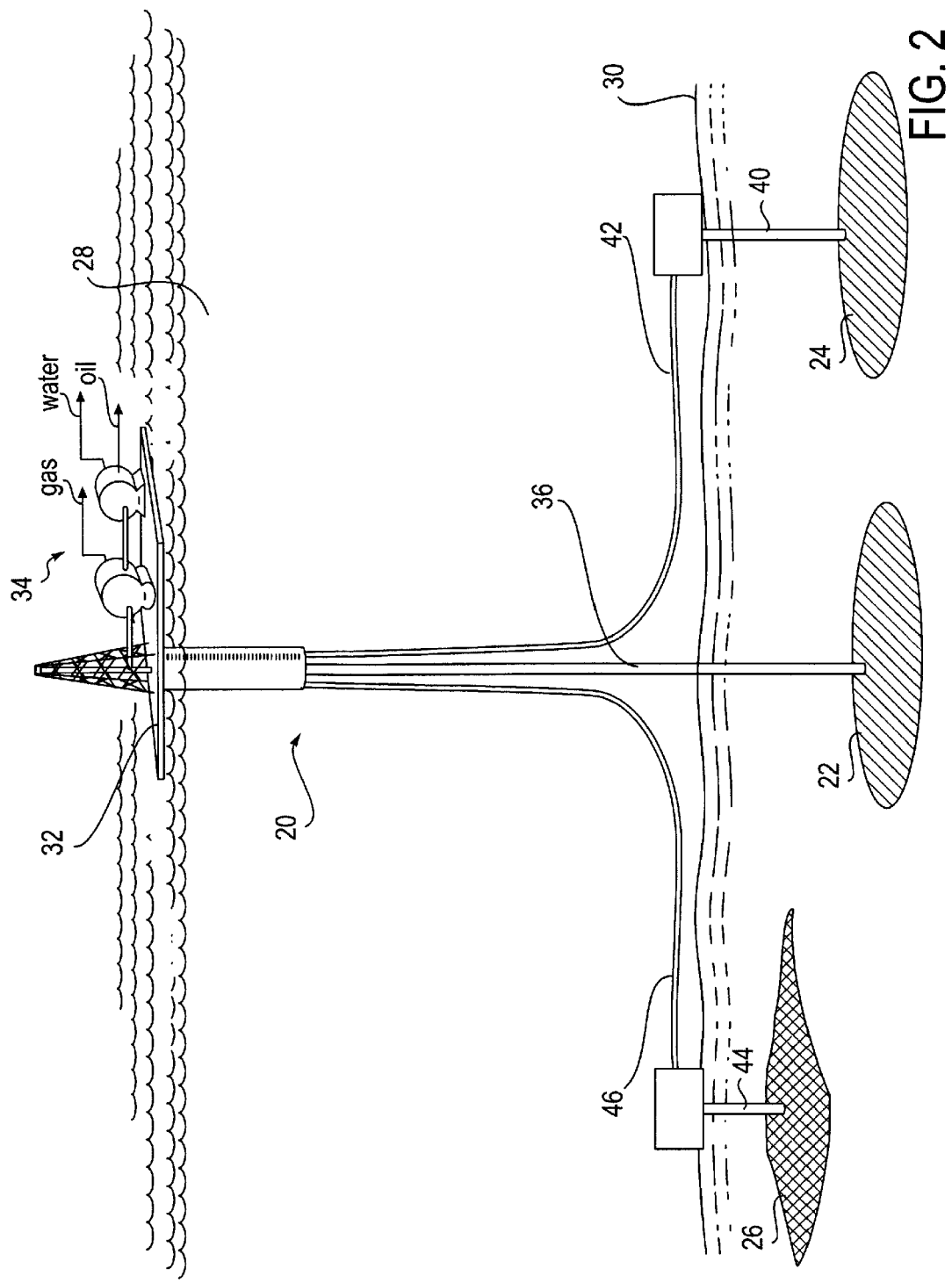
FIG. 2 is a schematic illustration of an offshore hydrocarbon production system including a production facility which concurrently receives and processes hydrocarbons and water from both offshore conventional oil and gas reservoirs and from one or more natural gas hydrate reservoirs.

I. Hydrocarbon Production Systems:

FIG. 2 is a schematic drawing of a first embodiment of an offshore or deepwater hydrocarbon production system 20. System 20 includes first conventional hydrocarbon reservoirs 22 and 24 and a second natural gas hydrate reservoir 26 disposed beneath sea water 28 and seafloor 30. Conventional hydrocarbon reservoirs 22 and 24 typically produce a first mixture of water and hydrocarbons such as natural gas and/or oil. Natural gas hydrate reservoir 26 produces water and hydrocarbons, primarily natural gas. Offshore platform 32 supports a production facility 34 which will be described in greater detail below with respect to FIG. 4. Production facility 34 is used to at least partially separate liquids, water and/or oil, from natural gas. Ideally, the water will be separated as well from oil by production facility 34.

In this particular first exemplary embodiment of hydrocarbon production system 20, conventional reservoir 22 is fluidly connected to production facility 34 by way of production tubing 36. Conventional hydrocarbon reservoir 24 is fluidly connected by way of a subsea well 40 and tieback 42 to production facility 34, Natural gas hydrate reservoir 26 is shown in fluid communication with a subsea well 44 which, in turn, is connected to production facility 34 by way of tieback 46. Conventional hydrocarbon reservoirs 22 and 24 produce first mixtures of water and oil and/or gas which are transported to production facility 34 for processing. Concurrently, natural gas hydrate reservoir 26 primarily produces a second mixture of natural gas and water which is delivered to production facility 34 for separation of natural gas and water, and oil if there are significant amounts of oil contained within the second mixture.

Production system 20 is only an exemplary embodiment. Those skilled in the art will appreciate that it is within the scope of the present invention to provide a hydrocarbon production system that includes only a single conventional hydrocarbon reservoir and a single natural gas hydrate reservoir producing to a single production facility. Alternatively, multiple conventional hydrocarbon reservoirs and multiple natural gas hydrate reservoirs may produce to the same production facility to have their produced fluids separated and treated. Also, the conventional hydrocarbon reservoirs may produce primarily oil, primarily gas or a combination of both, in addition to the water which is virtually always present in most conventional hydrocarbon reservoirs.

Figure 3:
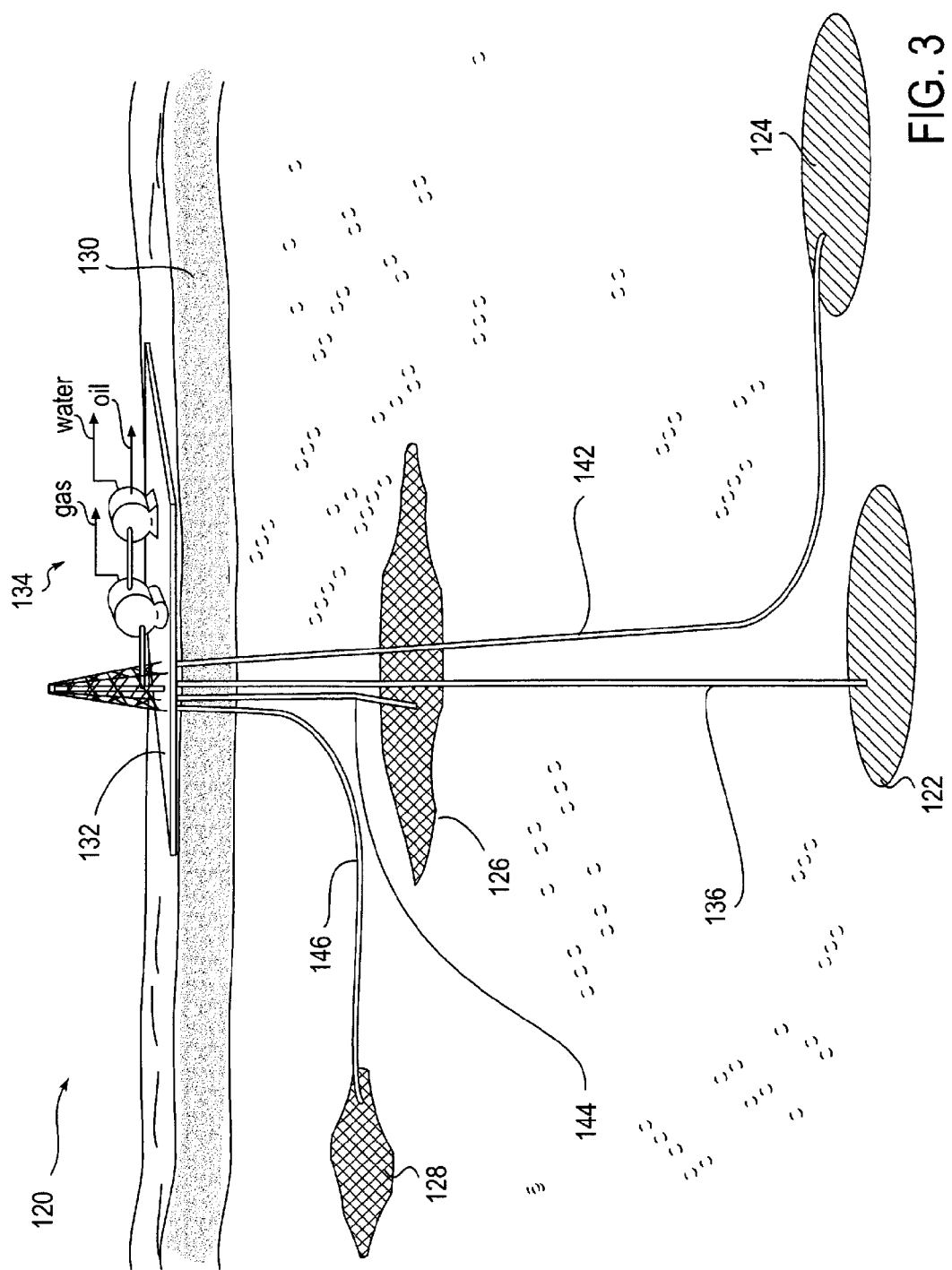
FIG. 3 is a schematic illustration of an onshore hydrocarbon production system including a production facility which concurrently receives hydrocarbons and water from both conventional oil and gas reservoirs and from one or more natural gas hydrate reservoirs, wherein the reservoirs are disposed beneath a layer of permafrost.

FIG. 3 is a schematic drawing of another exemplary embodiment of a hydrocarbon production system 120 which, in this case, is land rather than offshore based. Production system 120 includes conventional hydrocarbon reservoirs 122 and 124 and natural gas hydrate reservoirs 126 and 128. Disposed upon a permafrost layer 130 is an arctic platform 132. A production facility 134, generally similar to production system 34, is located atop arctic platform 132. Production facility 134 is used to separate and process natural gas, oil and water received from conventional hydrocarbon reservoirs 122 and 124 and natural gas hydrate reservoirs 126 and 128. Production tubings 136 and 142 fluidly connect conventional hydrocarbon reservoirs 122 and 124 to arctic platform 132 and production facility 134. A first mixture of water, gas and oil is typically produced from the conventional hydrocarbon reservoirs 122 and 124. Production tubing 144 and 146 are used to fluidly convey a second mixture of natural gas and water from natural gas hydrate reservoirs 126 and 128 to arctic platform 132 and production facility 134. The second mixture may also include a small portion of oil.

Figure 4:
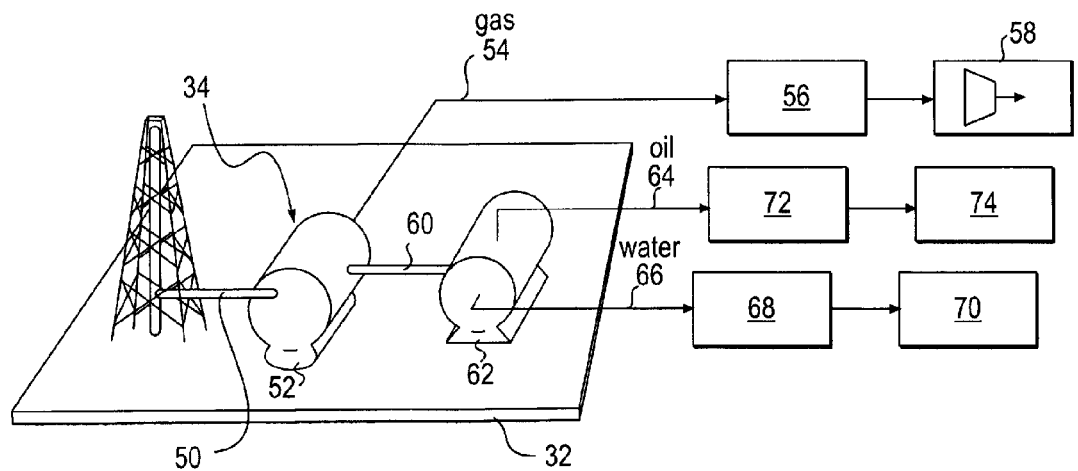
FIG. 4 is a schematic of an exemplary production facility including separation apparatus for separating water and hydrocarbons, i.e., natural gas and/or oil, received from conventional hydrocarbon and hydrate reservoirs, such as are seen in FIGS. 2 or 3.

FIG. 4 is a schematic drawing of platform 32 and production facility 34 which resides upon platform 32. First mixtures of fluids produced from conventional hydrocarbon reservoirs 22 and 24 and a second mixture of fluids produced from natural gas hydrate reservoir 26 are collected together and supplied to production facility 34. Production facility 34 includes an inlet line 50 which leads to a gas and liquid separator 52 wherein gases, including natural gas, are separated from liquids, such as oil and water. The gases are conveyed from gas and liquid separator 52 by way of a gas line 54 to gas treatment apparatus 56 and compression and export apparatus 58. Liquids from separator 52 are conveyed by a liquids line 60 to a water and oil separator 62 which separates water and oil. Gas, oil and water separation apparatus are well known in the art and will not be further described here.

Oil is carried away by oil line 64 and separated water by water line 66. The water can be further treated or processed by water treatment apparatus 68 and then sent to a body of water and/or reinjection apparatus 70. The oil can subsequently be further treated by oil treatment apparatus 72 and then send to storage or export apparatus 74. Storage or export apparatus 74 may be tanks (not shown) on platform 32. Alternatively, the treated oil may be offloaded to a transport vessel such as an oil tanker which serves as the storage apparatus. Further, treated oil may be transported by pipeline to onshore facilities. Those skilled in art will appreciate that rather than using platform 32 and production facility 34, a floating vessel can be used to support separation apparatus to separate gas, oil and water and then a separate platform or floating vessel used to store the separated fluids. Also, the first and second mixtures can be alternatively processed by the production facility 34. However, only one production facility 34 need be built to handle the separation needs of fluids concurrently produced from the conventional and natural gas hydrate reservoirs.

In a similar manner, separation apparatus 134 used in conjunction with arctic platform 132 can include a similar gas and liquid separator 52 and water and oil separator 62. Or else, separation apparatus 134 can be a single separation apparatus that separates gas, water and oil. Or if only primarily gas and water is produced from the conventional hydrocarbon and natural gas hydrate reservoirs, then only a gas and water separator is needed to separate produced fluids as part of the production facility 34.

Figure 5:
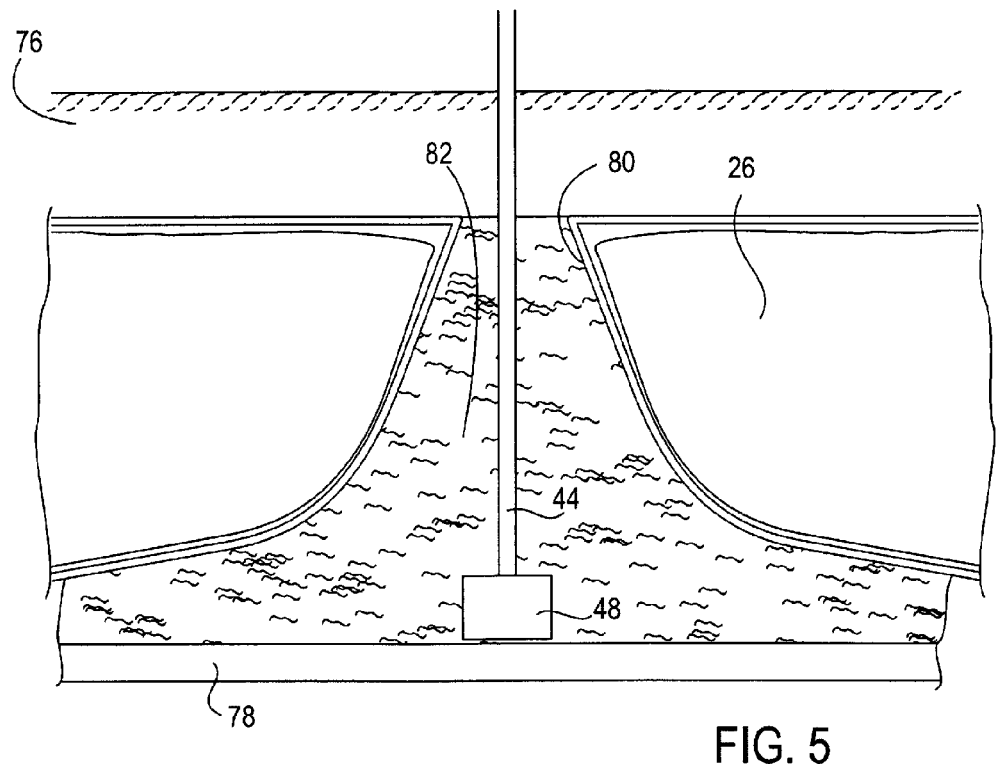
FIG. 5 is a sectional view of a natural gas hydrate reservoir producing natural gas and water to a wellbore utilizing depressurization of the natural gas hydrate reservoir to disassociate the natural gas hydrates into natural gas and water.

FIG. 5 shows a schematic of a natural gas hydrate reservoir, such as natural gas hydrate reservoir 26. Subsea well 44 is drilled and placed in fluid communication with reservoir 26.

In this particular embodiment, subsea well 44 may be used in conjunction with an electrical submersible pump (ESP) 48 to withdraw fluids, and thus lower pressure in hydrate reservoir 26. At sufficiently low pressures, natural gas hydrates in hydrate reservoir 26 will disassociate into a liquid mixture containing water, natural gas, and potentially some oil. This mixture is transported by well 44 and tieback 46 to platform 32 and production facility 34. Another manner for reducing pressure in a natural gas hydrate reservoir is to use gas lift.

As shown in FIG. 5, hydrate reservoir 26 is a natural gas hydrate reservoir having an overlying overburden layer 76 and underlying permeable or impermeable strata 78 bounding natural gas hydrate reservoir 26. Strata 78 may include water and/or free gas and/or oil. When depressurized, hydrates in fluid communication with vertical subsea well 44 disassociate forming a generally vertically oriented hour glass shaped disassociation front 80 centered about the wellbore and a disassociation zone 82 containing liquids and gases within a porous subterranean formation. If the wellbore is horizontal or inclined at any angle between the vertical and horizontal the shape of the dissociation front and dissociation zone may be different, but the same general principals will still apply.

Hydrate reservoir 26 may be a Class I (NGH over free gas), Class II (NGH over mobile water) or Class III (NGH over an impermeable stratum) or other hydrate containing reservoir. With respect to disassociating natural gas hydrates to produce the mixture of natural gas and water, a depressurization method utilizing an electrical submersible pump (ESP) such as described above with respect to FIG. 5 may be used. Another example of using an ESP to draw down pressure in a hydrate formation for natural gas production is described in U.S. Pat. Application 2007/0,144,738 entitled Method and System for Development of Hydrocarbon Bearing Formation Including Depressurization of Gas Hydrates.

Alternatively, other techniques may also be used to convert the natural gas hydrates into a fluid mixture which can be produced to a well bore and transported to the production facility. For example, introducing a source of heat to natural gas hydrate reservoir 26 may be used to induce disassociation of the natural gas hydrates. Warm water from an aquifer may be introduced to the hydrate reservoir such as described in U.S. Pat. No. 7,165,621, Method for Exploitation of Gas Hydrates. Additional heat may be added such as by combusting fuel and using the combustion products to heat the hydrates—see U.S. Pat. No. 6,973,968 entitled Method of Natural Gas Production. Alternatively, heat may be added by electrical resistance such as provided for in U.S. Pat. Application No. 2005/0,161,217, entitled Method and System for Producing Methane Gas from Methane Hydrate Formations. Those skilled in the art will appreciate that other heating methods may be used to cause disassociation of the hydrates to allow production into an adjacent well bore.

Another suggested manner for causing disassociation of the hydrates is through the use of chemicals. For example, U.S. Pat. No. 4,424,866 teaches using adding a hot supersaturated solution of $CaCl_2$ or $CaBr_2$ to a hydrate formation.

Yet another method for inducing disassociation of natural gas from the hydrate reservoir is through the introduction of a chemical which will substitute for the natural gas in the clathrate hydrate. U.S. Pat. No. 6,733,573, entitled Catalyst Allowing Conversion of Natural Gas Hydrate and Liquid $CO_2$ to $CO_2$ Hydrate and Natural Gas provides that carbon dioxide may be introduced into a hydrate reservoir to replace methane gas as the guest molecule to form a carbon dioxide hydrate. Similarly, U.S. Pat. No. 7,222,673 describes using carbon dioxide, nitrous oxide, or a mixture thereof, to replace the methane in the clathrate hydrate. The above-cited patents and patent applications are all hereby incorporated by reference in their entireties as example of ways of inducing disassociation of hydrates.

Those skilled in the art will appreciate that other methods may also be used to disassociate the natural gas from natural gas hydrate reservoirs and are within the scope of the present invention. The mixture of water and natural gas produced from the hydrate formations are then combined with the mixtures of hydrocarbons and water produced from one or more conventional hydrocarbon reservoirs to provide a combined production profile of water and gas, and possibly oil, to the production facility for separation and treatment of the produced fluids. Benefits of combining the production from both hydrate and conventional hydrocarbon reservoirs will now be described.

II. Production Profiles:

a. Conventional Hydrocarbon (Gas and Oil) Production System

In simplistic terms, conventional oil and gas production arises from the physical emptying of an earth-bound pressure vessel, i.e., a conventional hydrocarbon reservoir. The conventional hydrocarbon reservoir is typically a porous rock formation which is filled with natural gas and/or oil and water. A well is completed or placed in fluid communication with the conventional hydrocarbon reservoir allowing a fluid mixture of the gas, oil and water to be conveyed by the well and other conduits to a production facility. The production facilities often include gas, water and oil processing apparatus which are utilized to separate and treat the gas, oil and water.

Figure 6A:
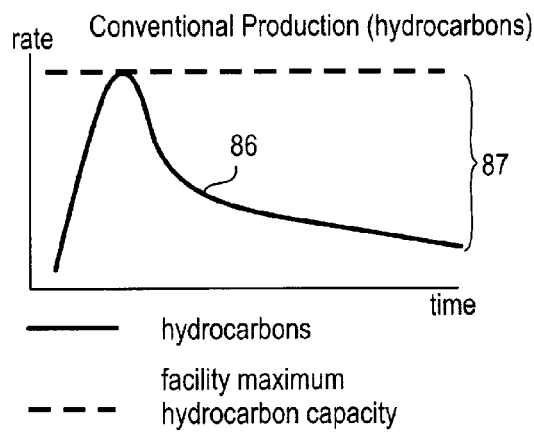
FIGS. 6A-B are graphs of respective production of gas and water from a conventional hydrocarbon reservoir wherein natural gas production peaks early in the life of the reservoir and then decreases over time while water production generally increases over time.

The initial production rate of gas and/or oil is often relatively high and peaks quickly, typically followed by a long and irreversible decline. FIG. 6A shows a production profile 86 depicting this peaking and declining of gas and/or oil production. The gas and/or oil separating and treatment apparatus must be designed to have sufficient capacity to handle the maximum production of gas and/or oil. However, the later underutilization of the capacity of the gas and/or oil separation and treatment apparatus is indicated by bracket 87. Enhanced oil recovery methods such as water flooding may be utilized in the late stages of production (secondary and tertiary methods) in an effort to keep the gas and/or oil production rate above the economic break-even point for as long as possible.

Figure 6B:
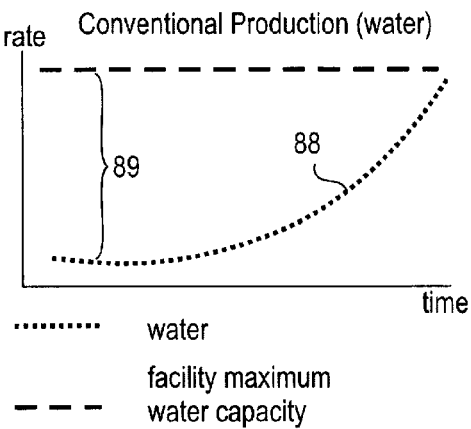

Conventional hydrocarbon reservoirs may have a water production profile, such as profile 88 in FIG. 6B, that is initially very low, but which increases over time. That is, the water cut in the produced fluids typically increase over time. Aquifers underlying the buoyant gas and oil slowly move toward the wellbores as the overlying gas and oil are removed from the conventional hydrocarbon reservoir. Water flooding may further enhance the amount of water produced from the conventional hydrocarbon reservoir which must be processed. Again, the water separation and handling apparatus must be designed to have sufficient capacity to treat the maximum water production. Bracket 89 suggests the underutilization of the water separation and handling capacity of the production facility during the early portion of the life of the production from the conventional hydrocarbon reservoirs.

The net consequences of the above production profiles are economically positive from a Net Present Value perspective. Expensive processing facilities must of course be built. However, the conventional hydrocarbon reservoir produces gas and/or oil at very high rates from the start, paying out the initial capital investment relatively soon and ideally leading to quick profitability. The production facilities, particularly offshore facilities, must however, also be built with substantial water processing capability that will remain underutilized for potentially decades because it is often difficult and expensive to add major facilities later in life to a hydrocarbon production system.

b. Natural Gas Hydrate Production System

Figure 7A:
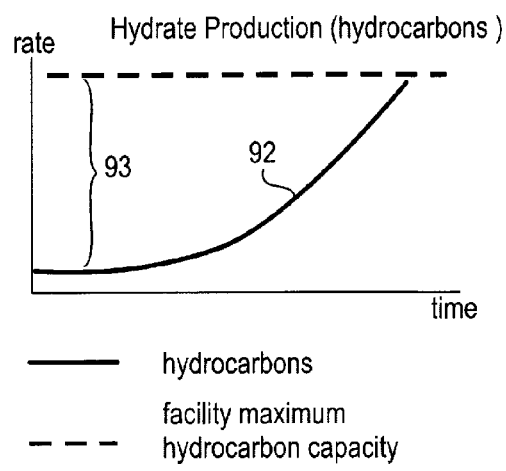
FIGS. 7A-B are graphs of respective production of gas and water from a natural gas hydrate reservoir wherein water production is high initially relative to gas production and then gas production increases relative to water production over the later stages of the life of the natural gas hydrate reservoir.
Figure 7B:
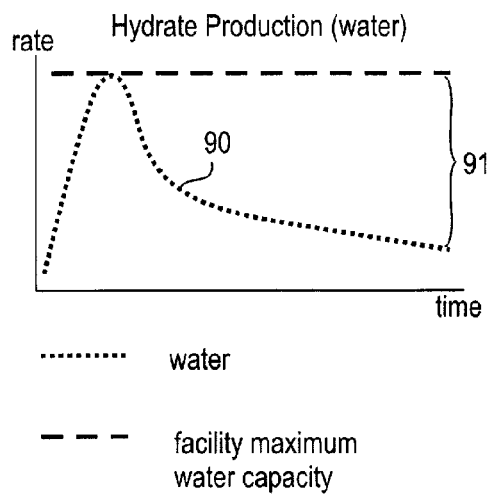

Referring now to FIG. 7B, the water production profile 90 from a natural gas hydrate reservoir peaks early. Assuming a depressurization method is used to induce hydrate disassociation, the reservoir pressure must be reduced to move the hydrate reservoir environment outside the hydrate stability envelope to induce hydrate disassociation into natural gas and water. This pressure drop is achieved in the embodiment described above with respect to FIG. 5 by the use of an ESP in the wellbore, pumping out water. The amount of water that must be pumped out to drop the pressure of a hydrate reservoir is substantial. Over time, as the reservoir approaches the optimal low pressure for sustained production, the pumping rate of water can be reduced dramatically. As indicated by bracket 91, underutilization of the water separation and treatment capacity of the production facility is substantial once a significant portion of the hydrate reservoir has moved outside the hydrate stability envelope, i.e., later in the production life of the hydrate reservoir.

Figure 8A:
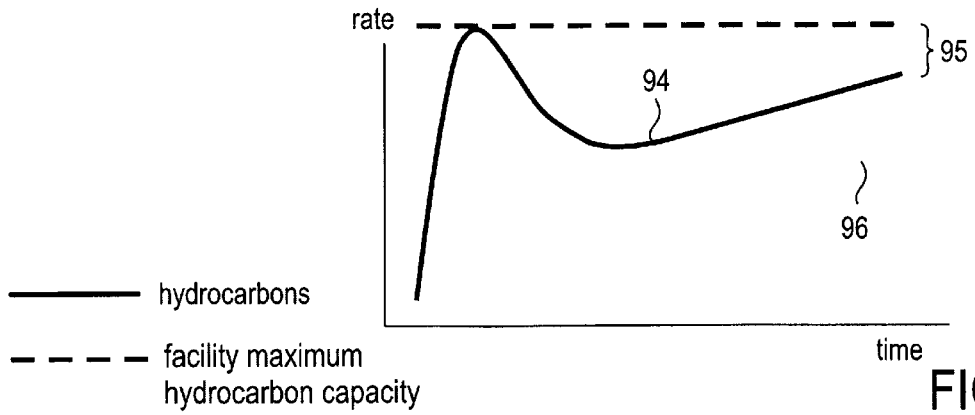
FIGS. 8A-B are graphs of respective production of gas and water jointly produced from the exemplary conventional hydrocarbon and natural gas hydrate reservoirs associated with the graphs of FIGS. 6A-B and 7A-B.
Figure 8B:
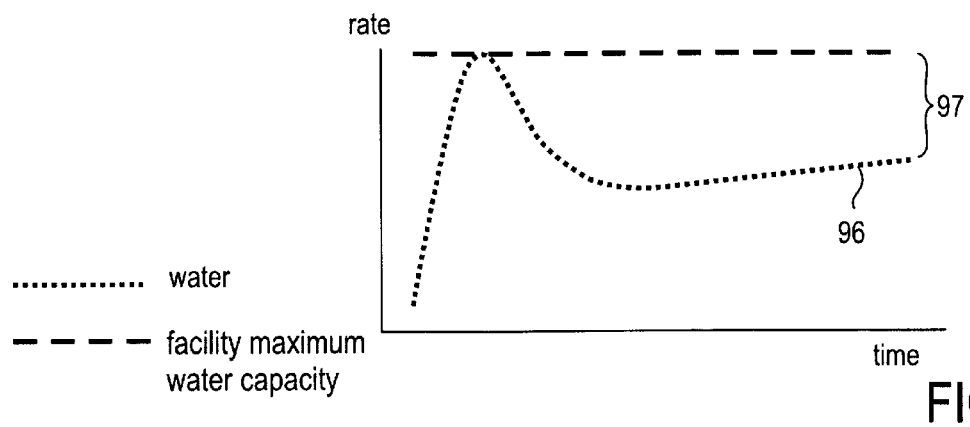
Figure 8C:
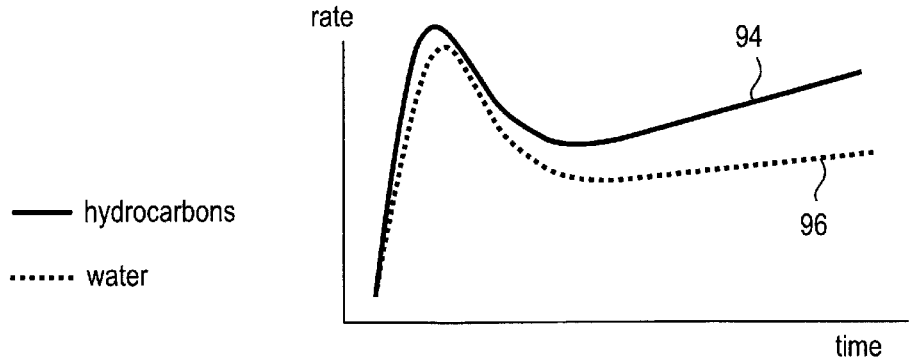
FIG. 8C is a graph showing the combined hydrocarbon and water production.

The gas production profile 92 starts low because the surface area of the dissociation front 80 is initially very small (localized to near the wellbore). The production profile 92 grows over time as the surface area of the dissociation front 80 expands outwardly, particularly due to the hour-glass shape of the disassociated zone 82 and the associated top and bottom bounding layers 76 and 78 of FIG. 5. Initially, water production increases rapidly to a peak. This water production allows for the disassociation volume in a hydrate reservoir to grow over time and pressure in the hydrate reservoir to drop leading to the release of natural gas from the solid hydrates. Accordingly, the quantity of natural gas produced relative to the amounts of water produced is increased over time. That is, the water cut in produced fluids ideally drops over time. The initial overcapacity of the hydrocarbon separation and handling apparatus is indicated by bracket 93 in FIG. 7A.

c. Combined Natural Gas Hydrate and Conventional Hydrocarbon Reservoir Production System FIGS. 8A, 8B and 8C show exemplary gas and water production profiles 94 and 96 wherein the production from one or more conventional hydrocarbon reservoirs is combined with the production from one or more natural gas hydrate reservoirs. In this case, the combined production of hydrocarbons and water from the overall production system, such as system 20 or 120 referenced above, results in a relatively more uniform production of water over time than is the case when only production from conventional reservoirs or hydrate reservoirs is utilized. Accordingly, the gas, oil and water processing facility may be more fully utilized over the life of the production system than if the production system utilized fluid production from only conventional hydrocarbon or only hydrate reservoirs.

Note the underutilization of hydrocarbon separation and treatment apparatus as suggested by bracket 95 in FIG. 8A, associated with combined hydrate and conventional hydrocarbon production, is less than that suggested bracket 87 in FIG. 6A (conventional hydrocarbon production) or by bracket 93 in FIG. 7A (hydrate production). Similarly, underutilization of water separation and treatment apparatus in FIG. 8B (combined hydrocarbon and hydrate production), as suggested by bracket 97, is less than the underutilization indicated by bracket 89 (conventional hydrocarbon production) of FIG. 6B or the underutilization provide by bracket 91 of FIG. 7B (hydrate production). FIG. 8C shows the production of both water and hydrocarbons due to the combined production of fluids from the conventional hydrocarbon and hydrate reservoirs.

The consequences of the above production profiles are economically positive from a Net Present Value perspective. Expensive facilities must of course be built, but they produce gas and oil at very high rates from the start, paying out the initial investment and generating relatively quick profits. These facilities (particularly offshore facilities) must, however, also be built with substantial water processing capacity that will remain unused for decades because it is too difficult and expensive to add major facilities later in life. With the concurrent production and processing of fluids from the hydrate reservoirs, in addition to those of the conventional reservoirs, the hydrocarbon and water separation and treating capacity of the hydrocarbon production systems 20 and 120 is more uniformly or fully utilized over the life of the project than if separate production facilities were employed to process produced fluids.

III. Development of Combined Hydrate and Conventional Hydrocarbon Reservoir Production Systems:

Each of systems 20 and 120 described above include both hydrate and conventional hydrocarbon reservoirs. The production from these reservoirs is concurrently produced and then processed using the same production facility. This joint production has the effect of combining the two production profiles from the conventional hydrocarbon and hydrate reservoirs.

The hydrocarbon production systems may be developed in a number of ways. First, a system including one or more conventional reservoirs and production facilities may be developed. Later, one or more nearby hydrate reservoirs may be developed and production tied into the production facility already in place to process the fluid mixtures produced from the conventional reservoirs. This particular manner of reservoir or field development provides the advantage of adding on hydrocarbon production from one or more hydrate reservoirs as a greenfield add-on where conventional reservoirs and a production facility have already been completed, i.e. a brownfield development.

Another method for developing the conventional hydrocarbon reservoirs and the natural gas hydrate reservoirs is to generally develop the reservoirs concurrently in time. The necessary wells are drilled and completed at approximately the same time. The advantage that this development scheme offers is that the same size facility can produce from both types of reservoirs from the start, providing maximum Net Present Value benefit. The least desirable configuration would be the current state of the art, i.e., separate facilities for conventional and hydrate fields.

The economic benefits of this combination of jointly producing from conventional and hydrate reservoirs in a hydrocarbon producing system are based upon at least some of the following rationale:

1. Only one production facility of a given size need be built, not two.
2. Hydrocarbon processing apparatus can be more fully utilized over the life of the hydrocarbon producing system as increasing hydrocarbon production from the hydrate reservoir or reservoirs supplement decreasing hydrocarbon production from conventional hydrocarbon reservoirs.
3. Water separation and treating apparatus will be more fully utilized over the life of the hydrocarbon producing system as increasing water production from the conventional hydrocarbon reservoirs is partially offset by decreasing water production from the hydrate or hydrate reservoirs.
4. Project risk is also dramatically reduced, because there are now two independent sources of hydrocarbons, i.e., conventional hydrocarbon and hydrate reservoirs, supplying the production facility.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for producing hydrocarbons from a plurality of hydrocarbon containing reservoirs, the method comprising:

producing a first mixture of water and hydrocarbons, including at least one of oil and natural gas, from at least one conventional hydrocarbon reservoir and transporting the first mixture to a production facility, including water separation apparatus, for processing the first mixture of water and hydrocarbons;

concurrently producing a second mixture of water and natural gas from at least one natural gas hydrate reservoir and transporting the second mixture to the production facility for processing the second mixture of water and natural gas; and processing the first and second mixtures utilizing the production facility to at least partially separate water and hydrocarbons from the first and second mixtures.

2. The method of claim 1 wherein:
the first and second mixtures are separated into oil, natural gas and water utilizing the production facility.

3. The method of claim 1 wherein:
at least one gas hydrate reservoir is disposed beneath a sea floor.

4. The method of claim 1 wherein:
at least one gas hydrate reservoir is disposed beneath permafrost.

5. The method of claim 1 wherein:
the production facility is located offshore.

6. The method of claim 1 wherein:
the production facility is located onshore.

7. The method of claim 1 wherein:
the second mixture is produced by depressurizing the natural gas hydrate reservoir to release natural gas and water from the natural gas hydrate reservoir.

8. The method of claim 1 wherein:
the water cut of the first mixture increases over time while the water cut of the second mixture decreases over time.

9. The method of claim 1 wherein:
the rate of water production in the first mixture increases over time while the rate of water production in the second mixture decreases after reaching a maximum water production rate.

10. A hydrocarbon production system comprising:
a first conventional hydrocarbon reservoir containing water and hydrocarbons including at least one of oil and natural gas;
a second natural gas hydrate reservoir containing natural gas hydrates; and
a production facility, including water separation apparatus, in fluid communication with the first conventional hydrocarbon reservoir and the second natural gas hydrate reservoir;
wherein the production facility can separate hydrocarbons and water concurrently produced from the first conventional hydrocarbon and the second natural gas hydrate reservoirs.

11. The hydrocarbon production system of claim 10 wherein:
the first conventional hydrocarbon and the second gas hydrate reservoirs are disposed beneath a sea floor.

12. The hydrocarbon production system of claim 10 wherein:
the first conventional hydrocarbon and the second natural gas hydrate reservoirs are disposed beneath permafrost.

13. A method of developing hydrocarbon production from hydrocarbon containing reservoirs, the method comprising:

developing a first conventional hydrocarbon reservoir containing water and hydrocarbons including at least one of oil and natural gas;
developing a second natural gas hydrate reservoir containing natural gas hydrates;
constructing a production facility including water separation apparatus; and
fluidly connecting the first conventional hydrocarbon and second hydrate reservoirs with the production facility;
whereby a first mixture of hydrocarbons and water from the first conventional hydrocarbon reservoir and a second mixture of natural gas and water concurrently produced from the second natural gas hydrate reservoir can be separated into water and at least one of the gas and oil by the production facility.

14. The method of claim 13 wherein:
the first conventional hydrocarbon reservoir is developed first and the first mixture of hydrocarbons and water is separated by the production facility for a period of time into hydrocarbons and water; and
subsequently the second natural gas hydrate reservoir is developed after developing the first conventional hydrocarbon reservoir.

15. The method of claim 13 wherein:
the first conventional hydrocarbon and the second natural gas hydrate reservoirs are generally concurrently developed.

16. The method of claim 13 wherein:
the water cut of the first mixture produced from the first conventional hydrocarbon reservoir is generally increased over the production life of the first conventional hydrocarbon reservoir.

17. The method of claim 13 wherein:
the water cut of the second mixture decreases over time relative to the water cut in the first mixture.

18. A method of jointly developing hydrocarbon production from hydrocarbon containing reservoirs, the method comprising:
a) developing a first conventional hydrocarbon reservoir containing water and hydrocarbons including at least one of oil and natural gas;
b) concurrently developing a second natural gas hydrate reservoir containing natural gas hydrates;
c) producing a first mixture of water and hydrocarbons including at least one of oil and natural gas from the first reservoir and transporting the first mixture to a production facility;
f) concurrently producing a second mixture of water and natural gas from the second reservoir and transporting the second mixture to the production facility;
g) processing the first and second mixtures utilizing the production facility to separate the water and produce at least one of natural gas and oil;
wherein the water cut of the first reservoir increases while the hydrocarbons decrease over time and the water cut of the second reservoir decreases while the natural gas increases over time.

19. The method of claim 18, wherein the separating of the water and the processing of the at least one of the natural gas and oil remains consistent with the concurrent production from the first and second reservoirs.

* * * * *